(12) United States Patent
Yang et al.

(10) Patent No.: US 11,676,351 B1
(45) Date of Patent: Jun. 13, 2023

(54) AUTOMATED REFINEMENT OF AUGMENTED REALITY VIRTUAL OBJECT ANNOTATIONS

(71) Applicant: International Business Machines Corporation, Armonk, NY (US)

(72) Inventors: Xiang Yu Yang, Xi'an (CN); Deng Xin Luo, Xi'an (CN); Zhong Fang Yuan, Xi'an (CN); Yong Wang, Xi'an (CN); Ye Wang, Xi'an (CN); Wen Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/673,071

(22) Filed: Feb. 16, 2022

(51) Int. Cl.
G06T 19/00 (2011.01)
G06T 17/20 (2006.01)
G06T 7/70 (2017.01)

(52) U.S. Cl.
CPC .............. *G06T 19/006* (2013.01); *G06T 7/70* (2017.01); *G06T 17/20* (2013.01)

(58) Field of Classification Search
None
See application file for complete search history.

(56) References Cited

U.S. PATENT DOCUMENTS

| 9,088,787 | B1 | 7/2015 | Smith et al. | |
|---|---|---|---|---|
| 9,928,655 | B1 | 3/2018 | Alston | |
| 2005/0249426 | A1* | 11/2005 | Badawy | H04N 19/597 382/241 |
| 2017/0199855 | A1* | 7/2017 | Fish | G06Q 10/109 |
| 2018/0341811 | A1 | 11/2018 | Bendale et al. | |
| 2021/0042992 | A1* | 2/2021 | Newman | G06T 19/006 |
| 2021/0192841 | A1 | 6/2021 | Hu et al. | |

FOREIGN PATENT DOCUMENTS

CN 111582391 A 8/2020

OTHER PUBLICATIONS

Boyko, Aleksey S., "Efficient Interfaces for Accurate Annotation of 3D Point Clouds", PhD Thesis, Princeton University, Feb. 2015, 119 pages.
Kastner, Linh et al., "A 3D-Deep-Learning-based Augmented Reality Calibration Method for Robotic Environments using Depth Sensor Data", arXiv:1912.12101v1 [cs.CV] Dec. 27, 2019, 7 pages.

* cited by examiner

*Primary Examiner* — Tapas Mazumder
(74) *Attorney, Agent, or Firm* — Stephen J. Walder, Jr.; Robert D. Bean

(57) ABSTRACT

Mechanisms are provided for generating an augmented reality representation of a real-world environment. An augmented reality (AR) system receives a captured digital image of the real-world environment and generates an initial estimate of a candidate point specifying an estimated location of an annotation point of a virtual object model within the captured digital image of the real-world environment. An accuracy of the initial estimate is calculated based on a function of characteristics of the annotation point and a function of characteristics of the candidate point and, in response to the evaluation of accuracy indicating that the initial estimate is not accurate, an annotation point location refinement operation is performed to generate a refined candidate point for aligning the annotation point with the captured digital image of the real-world environment. An AR representation of the real-world environment is generated based on the refined candidate point.

20 Claims, 6 Drawing Sheets

AUTOMATED REFINEMENT OF AUGMENTED REALITY VIRTUAL OBJECT ANNOTATIONS

BACKGROUND

The present application relates generally to an improved data processing apparatus and method and more specifically to mechanisms for automatically refining virtual object annotations in an augmented reality application based on an alignment of annotation points with points in a model of the real-world environment.

Augmented Reality (AR) is a technology in which images of the real-world environment are enhanced by computer-generated perceptual information, sometimes across multiple sensory modalities, including visual, auditory, haptic, somatosensory and olfactory information, to provide a combined virtual and real-world representation of the real-world that alters the perception of the real-world for the user. AR combines real and virtual worlds, provides real-time interaction, and three-dimensional registration of virtual and real objects. In general, current uses of AR involve inserting a virtual object into the visual representation of the real-world through use of a computing device and a digital camera or other image capture device. In some cases, other textual, audible, and/or tactile information may accompany the virtual object, and in many cases, a user is able to interact with the virtual object through the computing device while the virtual object is represented as being in the environment of the real-world.

As AR technology advances, the virtual objects are more and more seamlessly interwoven with the physical world such that it is perceived as an immersive aspect of the real environment, thereby altering the user's perception of the real-world environment. AR has many valuable uses in which a perception of the actual real-world environment is still needed, but where computer technology can improve upon that perception, e.g., for professional, industrial, scientific, commercial, or entertainment purposes. This differs from other technologies, such as virtual reality (VR), which completely replace the user's real-world environment with a simulated environment that may, or may not, have a resemblance to a real-world environment, or the particular real-world environment that the user is actually presently in.

A primary value of augmented reality is the manner in which components of the digital world blend into a user's perception of the real-world, not as a simple display of data, but through the integration of immersive sensations, which are perceived as natural parts of an environment. Augmented reality is used to enhance natural environments or situations and offer perceptually enriched experiences. With the help of advanced AR technologies (e.g. adding computer vision, incorporating AR cameras into smartphone applications and object recognition) the information about the surrounding real-world of the user becomes interactive and digitally manipulated.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for generating an augmented reality representation of a real-world environment. The method comprises receiving, by an augmented reality (AR) system of the data processing system, a capture digital image of the real-world environment. The method further comprises generating, by the AR system, an initial estimate of a candidate point specifying an estimated location of an annotation point of a virtual object model within the captured digital image of the real-world environment. In addition, the method comprises evaluating, by the AR system, an accuracy of the initial estimate based on a function of characteristics of the annotation point and a function of characteristics of the candidate point. Moreover, in response to the evaluation of accuracy indicating that the initial estimate is not accurate, the method comprises executing, by the AR system, an annotation point location refinement operation to generate a refined candidate point for aligning the annotation point with the captured digital image of the real-world environment. Furthermore, the method comprises generating an AR representation of the real-world environment based on the refined candidate point. The AR representation comprises the captured digital image of the real-world environment augmented with an annotation corresponding to the annotation point.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
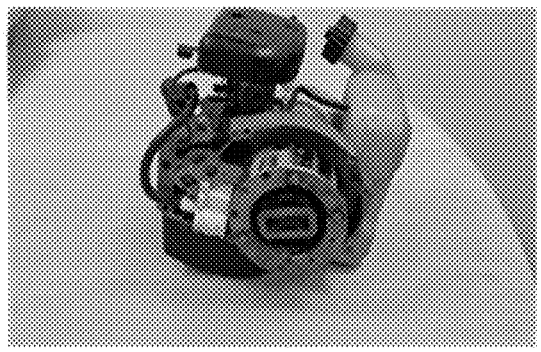
FIGS. 1A-1D are diagrams illustrating examples of real-world objects and corresponding virtual object model representations in accordance with one illustrative embodiment.

As mentioned above, augmented reality (AR) is an advanced technology that enhances the real-world by integrating virtual objects and information into representation of the real-world for entertainment and non-entertainment applications. Recently, in non-entertainment applications, AR has been used to assist with medical applications to assist doctors in performing surgeries, industrial applications to assist workers in performing operations in manufacturing, vehicular repair to assist mechanics and technicians in diagnosing and repairing vehicular components, and the like. Many times, these applications of AR involve the generation of three dimensional (3D) virtual object models, i.e., data models representing a real-world object as a virtual object model that may be rendered by a computing tool, where the virtual object model has associated annotations that specify information about the virtual object.

In some cases, annotations may specify procedures that a human user is to perform with regard to the virtual object and/or corresponding real world object, and with regard to operations corresponding to the particular application of the AR mechanisms, e.g., in a medical application, the virtual object may be a portion of a patient's anatomy and the annotation may specify or link to real-time vital sign information associated with that portion of the anatomy, specify medical procedures to perform with regard to that portion of the anatomy, or any other suitable information that is relevant to the particular application and which may be linked to the virtual object via the virtual object model and annotation data. Similarly, in a vehicle repair application, the virtual object may be a part of the vehicle, e.g., a hose in the engine compartment, and the annotations may specify or link to real-time diagnostic results associated with the part, procedures to perform with regard to the part, or any other suitable information that is relevant to the particular application and which may be linked to the virtual object via the virtual object model and annotation data.

In generating a virtual object model for an AR application, an image capture device, such as a digital camera, a laser based sensor device, or other image capture and/or sensing device, captures data representing the real-world object. For example, in the case of an image capture device, a video or sequence of images of the real-world object that is to be represented as a virtual object is captured and a virtual object application converts the captured video/images of the virtual object into a 3D virtual object model. In laser based mechanisms, lasers are used to scan the real-world object and generate point data which is converted by a virtual object application into a 3D virtual object model. One technology recently developed for generating 3D virtual object models based on video/image capture and/or laser based sensor systems is the 3D point cloud technology. The 3D point cloud captures thousands or millions of points of the surface of a real-world object within a 3D coordinate space. Each point in the 3D point cloud has associated data which at the least includes the 3D coordinates of the point, but may include other information including color, luminesce, and the like. In some cases, for example, photogrammetry may be used to generate the 3D point cloud representing a real-world physical object. To generate a 3D virtual representation of the real-world object, the 3D point cloud may be converted to a polygonal mesh which is used by many computer 3D modeling graphics applications to generate visual representations of objects, with captured images being mapped to the polygonal mesh.

The 3D point cloud and/or the polygonal mesh generated from the 3D point cloud may be considered a virtual object model for use with an AR application. In some cases, human users may add data to the points present in the 3D point cloud, or virtual object model, by adding annotations to specified points in the 3D point cloud or virtual object model. These annotations are a type of metadata that can take many different forms depending on the desired implementation. For example, in the case of a vehicle repair AR application, a human user may obtain a virtual object model for a particular part of the vehicle and may annotate this virtual object model by associating with one or more points of the virtual object model, procedures that a technician, mechanic, or other user should follow with regard to diagnosing problems and/or repairing a vehicle with the specified part. As a result, when the virtual object model is used to generate an AR visual representation in the representation of the real-world environment, such as by overlaying or otherwise integrating the virtual object model into the visual display of the image of the real-world environment captured by the image capture device and displayed on a display of a computing device, e.g., mobile telephone, tablet computing device, computer enabled glasses, visor, other heads-up display device, the annotations may be made available to the user through the AR visual representation and may be manipulated by the user via one or more user interfaces, e.g., computing device peripherals, voice command inputs, tactile or other motion based inputs, etc.

The generation of 3D point clouds and other types of virtual object models is generally known in the art. Moreover, the use of AR applications to augment images of real-world environments is also generally known in the art. Thus, a more detailed description of the process for generating virtual object models and implementing them in AR applications in general is not provided herein. Any suitable virtual object model generation applications and devices as well as AR applications and devices may be used with the mechanisms of the illustrative embodiments as described hereafter without departing from the spirit and scope of the present invention.

For purpose of illustration, the following description of the illustrative embodiments will assume a 3D point cloud model of a real-world object is generated in a manner generally known in the art and annotated by a human user using appropriate computer annotation mechanisms to thereby generate an annotated virtual object model. Moreover, an example of an automotive diagnostic and repair AR application will be used to demonstrate the improvements provided by the mechanisms of the illustrative embodiments. It should be appreciated that these are chosen for this description as only examples, and the present invention is not limited to these particular virtual object model generation applications or AR applications. Other virtual object model generation applications and AR applications may be used without departing from the spirit and scope of the present invention.

While the generation of a virtual object models for use in AR applications provides a technological advancement for assisting users with understanding and interacting with the real-world environment by providing virtual augmentations to provide representations and user perceptions that otherwise do not exist in the real-world, there are still limitations that need to be addressed. One such limitation of current virtual object models and AR applications is that the virtual object models are specific to a particular real-world object and corresponding real-world environment. That is, if a virtual object model is generated for a particular part of a vehicle, e.g., a hose in an engine compartment of a car, the virtual object model is specific to that particular hose and that particular year, make and model of car. For example, the hose is located in a specific place within the engine compartment of that particular year, make, and model of the car. If there is a change to the real-world environment, e.g., there is a design change to the part, or to the vehicle's engine compartment in a later year or later similar model, then the virtual object model and/or its location within the real-world environment will no longer be the same. Moreover, the annotation locations, e.g., points in the virtual object model having associated annotations, may no longer be accurate to the most recent object/environment. This may cause confusion on the part of the user as it will erroneously identify points in the AR representation of the real-world environment where the annotations are presented in the overlay of the virtual object within the real-world environment, e.g., the virtual object will be shown in an incorrect location in the AR representation of the real-world environment of the AR application and thus, the annotation will be in an incorrect location within the AR representation of the real-world environment.

For example, the virtual object corresponding to the hose in the above example, via the AR representation, may be shown in the wrong place within the engine compartment and thus, the annotation associated with a point on the hose will be in the wrong place of the engine compartment. As a result, the user of the AR application will be confused as to where to perform procedures specified in the annotation since the AR representation does not match what they are actually seeing in the real-world environment. This may result in frustration on the part of the user due to the inaccuracy of the AR representation, or in more critical situations, may result in damage to the real-world environment or risk to the user, such as in a manufacturing environment or the like. To avoid such a situation, it is possible to generate new virtual object models and new models of real-world environments every time there is a design change or there is a different real-world environment encountered, e.g., for each modification of the hose and each different year, make, or model of the vehicle, but such an approach is not practical as it requires a large expenditure of computer resources, human resources, and time, and is otherwise costly to implement. Thus, it would be beneficial have an automated computing tool that can automatically refine the virtual object model annotations used in AR representations so that they are accurate to new real-world environments and/or modifications to the real-world objects that the virtual object models represent.

The illustrative embodiments provide an improved computing tool to perform such automated refinement of virtual object model annotations within an AR representation of a real-world environment so as to make the locations of the virtual object and its annotations accurate to the real-world environment being represented by the AR application. The illustrative embodiments assume that a virtual object model is generated for one or more real-world objects using any suitable virtual object generation application and corresponding image capture and/or sensing devices, e.g., digital cameras, laser based sensing devices, etc. Each point in the virtual object model for a real-world object has corresponding coordinate information within a 3D space, and may have additional information that details other characteristics of the point, e.g., color, luminescence, and the like. The illustrative embodiments may further generate a computer model of the real-world environment in which the virtual object is present, e.g., an engine compartment of a vehicle, such that the relative location of the virtual object to other objects within the real-world environment may be determined within the 3D space.

The illustrative embodiments then, via a computer user interface, presents the virtual object to a subject matter expert (SME) or other authorized human user, who can annotate desired points of the virtual object via the computer user interface. For example, the SME may annotate points on the virtual object model to specify procedures or actions that another human user, e.g., a technician, mechanic, or other user, referred to hereafter as the "human operator", is to perform with regard to real-world objects in the real-world environment to accomplish a desired task, e.g., diagnosis, repair, or the like. For example, various annotations may be associated with the virtual object model(s) to accomplish a task for replacement of a hose within a vehicle engine compartment, where a first point in association with a first virtual object model of a vehicle hood may have an annotation to "pick up the hood", a second annotation associated with a second point of a second virtual object model of the hose may specify to "inspect the connector", a third annotation associated with a third point of the second virtual object model may specify "connect hose to radiator port", and a fourth annotation associated with a fourth point of the second virtual object model may specify "check if hose is stable". Thus, the combination of these annotations associated with different points of the virtual object models provides a procedure for replacement of a hose within the engine compartment.

Assuming that the virtual objects are represented in the AR representation of the real-world environment, which has the augmentation of an overlay of the virtual object and its annotations in the images of the real-world environment, in a correct position, the human operator can use a computing device to execute the AR application which uses the image capture device of the computing device to capture images of the real-world environment and loads one or more virtual object models to present overlays of the real-world environment digital images. That is, the human operator may specify the particular real-world environment being represented in the AR application so that the AR application can load or otherwise access the virtual object models corresponding to that real-world environment. In some cases, the human operator may specify the particular operation or task to be performed, and virtual object models may be associated with that particular operation or task which are then retrieved and loaded or made accessible by the AR application.

The AR application may cause the human operator's computing device to capture images of the real-world environment to thereby generate a real-time computer model of the real-world environment currently being viewed by the human operator. Thus, there is one or more virtual object models for real-world objects that should be present in the real-world environment, these will be referred to as first computer models (M1), and there is at least one computer model for the real-world environment currently being viewed by the human operator, which will be referred to as a second computer model (M2). The one or more first computer models M1 are integrated with the at least one second computer model M2 to generate an integrated AR computer model representation by correlating points in the 3D space between the computer models M1 and M2. As a result, annotations associated with points in the one or more first computer models M1 are associated with corresponding points of the at least one second computer model M2 and thus, integrated points of the AR computer model representing a combination of the virtual objects with the currently viewed real-world environment.

Thus, by using the computing device to capture images of the currently viewed real-world environment, the human operator is presented with an AR representation of the real-world environment in which virtual objects, or at least there annotations, are represented in the computing device's output. That is, the AR application may represent the images of the real-world environment on the display screen of the computing device, with annotations and/or overlays of the virtual objects on the images being output on the computing device's display. The particular virtual objects that are to be represented in the AR representation of the real-world environment may be selected by a user specifying an environment or task that they are attempting to accomplish and retrieving one or more virtual objects from a virtual object store that are associated with the specified environment or task, or a most similar environment or task. The user may be presented with options for selection of which virtual objects are to be incorporated into the AR representation. In other illustrative embodiments, an automated mechanism may be employed that provides a platform, functionality, and/or service to identify the real-world objects and then choose the corresponding virtual object models from the virtual object model store. These mechanisms may provide a recognition functionality or service based on object detection or image classification algorithms, such as may be provided via a deep learning network and object data used to train the deep learning network.

The AR application may modify the images being output as the human operator manipulates the computing device, e.g., moves the computing device relative to the real-world environment such that new perspectives are presented, and/ or manipulates the display, e.g., through user interaction with a touchscreen or other peripheral of the computing device to thereby interact with a graphical user interface or other user interface of the computing device. It should be noted that in presenting the AR representation via the AR application and the display, the virtual object itself need not be explicitly represented and only the annotations may be presented as graphical objects so as to maximize the viewability of the real-world environment in the display of the computing device but providing annotations to assist the human operator, e.g., overlays of flags or other graphical/textual representations of annotations may be presented with lines or other pointers to their associated points in the AR representation.

Assuming that the correlation between points in the virtual object model(s) M1 are accurate with the at least one second model of the currently viewed real-world environment M2, then the annotations and/or overlays of the virtual objects in the AR representation, will be accurately shown in the output of the AR application. Thus, the human operator may interact with the AR application's output to follow the procedure or perform operations specified in the annotations with regard to real-world objects to thereby perform a desired task defined by the combination of annotations. This can be accomplished even if the human operate is unfamiliar with the real-world objects or real-world environment as the annotations may provide a step-by-step guidance to the human operator allowing them to accomplish the task, e.g., replacing a hose in the engine compartment of the vehicle.

However, as mentioned above, if the real-world environment currently being viewed does not match the real-world environment that was present when the one or more first computer models M1 of the virtual objects were generated, then there will be an inconsistency and error in the AR representation of the real-world environment currently being viewed by the human operator, e.g., virtual objects will be mislocated in the AR representation and thus, the corresponding annotations will be likewise mislocated. That is, when the AR representation is being generated by the AR application by integrating the points of the one or more virtual object models M1 with the points in the at least one model of the currently viewed real-world environment M2, there will be a mismatch due to changes in the real-world environment, e.g., if there has been a design change in the current vehicle engine compartment from the vehicle engine compartment of the original model of the hose, then the currently viewed engine compartment will not match the engine compartment of the original model of the hose and hence, the points in the 3D model of the hose will not match the points in the currently viewed engine compartment. As a result, the hose and/or its annotations will not be properly located in the AR representation of the currently viewed engine compartment.

Thus, with the mechanisms of the illustrative embodiments, as part of the generation of the AR representation, or integrated computer model of the AR representation of the currently viewed real-world environment, the annotation locations are refined to be accurate to the currently viewed real-world environment. The illustrative embodiments, for a virtual object model that is to be used to augment a currently viewed real-world environment, attempts to correlate points of the virtual object model (M1) with points in the generated 3D computer model of the currently viewed real-world environment (M2), captured by an image capturing device of the human operator's computing device and generated by a 3D computer modeling applications. The correlation may be performed using a model tracking algorithm that uses mathematical formulations to do transformations, rotations, translations, and scaling of models between the AR tool coordinates and real-world coordinates. Then, for the virtual object, when the virtual object is created its image features are captured and these features are used to build a feature tree. When performing the correlation, the current image being captured is used to compute image features, and then compute the distance between the features and the built feature tree to match the images. The three-dimensional points of the virtual object model are then projected into the two-dimensional display of the AR representation.

A determination is then made, either automatically, or in response to the human operator's input, whether the integration of the virtual object model M1 into the computer model of the currently viewed real-world environment M2 is performed satisfactorily or not. With regard to an automatic determination, the system may automatically determine a difference between the characteristics of points of the virtual object model M1 and the corresponding objects in the real-world environment M2 such that if the difference in these characteristics is above a predetermined threshold, then the difference is considered to represent an unsatisfactory alignment. With a manual process, the user may be presented with user interface elements presented along with the AR representation, through which the user may specify that the AR representation is not correct and request a refinement of the virtual objects in the AR representation.

For example, an initial AR representation of the real-world environment augmented with the virtual object overlay, based on the coordinates of the points of the virtual object model relative to the coordinate space of the model M2 of the currently viewed real-world environment may be generated, and annotations may be presented, for the human operator to view to determine if the virtual object is properly positioned relative to the real-world environment or not. If the user determines that the alignment of the virtual object with the real-world environment is not satisfactorily accurate in the human user's opinion, the human user may then provide an input via the graphical user interface, or via other computer interface, to specify a need to refine the alignment and annotation location of the virtual object relative to the real-world environment.

In some illustrative embodiments, rather than, or in addition to, the human user reviewing the initial AR representation, an automated analysis and comparison of the of the characteristics of the points of the virtual object model with aligned or correlated points in the model of the currently viewed real-world environment may be performed to determine if points of the virtual object model have sufficient similarity, i.e., within a threshold, of points in the model of the currently viewed real-world environment. That is, aligned points in M1 and M2 are compared to determine if they have similar characteristics, such as depth, density, distance from each other, color, luminescence, etc. If such points have sufficient similarity, e.g., their differences are equal to or less than a predetermined threshold, then the virtual object model may be determined to be satisfactorily positioned within the AR representation, but allowing the user to override such a determination and request refinement if desired. If such points do not have sufficient similarity, e.g., the differences are greater than the predetermined threshold, then a refinement may be automatically initiated. It should be appreciated that this automated analysis may be performed specifically with regard to only points of the virtual object model that have associated annotations, a plurality of randomly selected points of the virtual object model, i.e., a subset of the points of the virtual object model, or the like. Satisfactory alignment and integration of the virtual object model into the AR representation may be determined based on a function of how well these points are aligned, e.g., if a majority or a certain number or percentage of the points are satisfactorily aligned, as measured by the threshold based comparison as described above, then the virtual object model may be considered satisfactorily aligned; otherwise, it is not.

In performing the comparison to determine if refinement is necessary, and/or as part of the evaluations of points during the refinement operation, a function of the characteristics of the points, and/or points within a given range of the point of interest, may be used to perform the comparisons and evaluate similarity of points. This function can take many different forms depending on the desired implementation. In one illustrative embodiment, the function takes the general form of:

$$func = \sum_{i=0}^{n} w_i char_i \quad (1)$$

where $w_i$ is a constant coefficient and $char_i$ is the characteristic of the point, e.g., density, depth, distance from a reference point, luminescence, color, etc. It should be appreciated that in some illustrative embodiments, the characteristic may also be a function of other values associated with the point and/or points within a given range or distance of the point of interest.

In some illustrative embodiments, the point of interest in the virtual object models are the points of the virtual object models that have associated SME added annotations, e.g., information specifying operations of a procedure or process to perform a task. Thus, these points of interest will be referred to as annotation points hereafter. These annotation points may have their functions of characteristics (see Eq. 1 above) evaluated and the result of the function compared to similarly calculated function values of other points to evaluate whether a virtual object model M1 is properly aligned with the model of the currently viewed real-world environment M2 to determine whether to initiate or trigger refinement operations, and may be used to perform a search for sufficiently similar points in a nearby area when performing the refinement operation, as discussed hereafter. For example, if the difference between the function value of a first point and the function value of a second point is equal to or below a predetermined threshold value, then the points are determined to be sufficiently similar or sufficiently aligned. If the difference between the function values is greater than the predetermined threshold value, then they are determined to be not sufficiently similar or not sufficiently aligned.

Assuming that a refinement operation is needed to refine the annotation point location in the integration of the virtual object model M1 with the model of the currently viewed real-world environment M2 (referred to hereafter as the environment model M2) to generate the AR representation of the real-world environment augmented with the virtual object overlay and/or annotation point overlay, the refinement operation involves performing a search of points in the environment model M2 for a point P2 having a function value that is sufficiently similar or sufficiently aligned with the function value of the annotation point P1. That is, given an annotation point P1 of a virtual object model, and based on an initial attempt at alignment of the virtual object model M1 with the environment model M2 to identify a starting point SP in the environment model M2 as the initial estimate as to a point with which annotation point P1 is aligned, a search for a point P2 is performed within a given search step size of the starting point SP. For example, a search may be performed by selecting points in a range or radius around the starting point SP, in 3D space, where the range/radius is equal to the search step size.

Points may be randomly or pseudo-randomly selected, which are within a given range or radius. The search may be, for example, a random gradient search or other random search algorithm. The function of Eq. 1 above may be calculated for the annotation point P1 and then the similar function of Eq. 1 may be calculated for the selected search point. The absolute difference value between the function values of points P1 (func(p1)) and PX (func(px)) may then be calculated and compared to a predetermined threshold, where this predetermined threshold specifies a difference indicating the points to be sufficiently similar or sufficiently aligned, i.e., if the absolute difference of the function values for points P1 and PX is equal to or less than the threshold, then the points are sufficiently similar or sufficiently aligned and PX may be considered an appropriate point for alignment of the annotation, i.e., point P2. If the absolute difference of the function values is greater than the threshold, then the points P1 and PX are not sufficiently similar or sufficiently aligned.

If the function value for the point PX is not sufficiently similar to the function value of the point P1, then a determination is made as to whether the number of sampled points within the given range or radius of the start point SP is equal to or greater than a predetermined threshold number of search points. If the number of sampled points is not equal to or greater than the predetermined threshold number of search points, then the search is continued with a next sampled point at the specified range or radius corresponding to the current search step size. If no sufficiently similar point is found through the search at the current search step size, and the predetermined number of search points is reached or exceeded, then the search step size is reduced by a predetermined amount and the search is again repeated with the new search step size. This may be repeated until either a minimum search step size is reached, where in some cases this minimize search step size may be 0, meaning that the search includes only the original start point SP.

If through this search a suitable point P2 is not found to align with the annotation point P1, then the human operator may be informed that the virtual object model M1 cannot be automatically aligned to the environment model M2 and request that the human operator manually update the alignment of the annotation point with the environment model M2. The manually specified alignment point P2 may then be used to update the virtual object model M1's annotation point characteristics, and potentially other annotation points of the virtual object model M1 based on the realignment of the virtual object model with the environment model M2. That is, having updated the characteristics of the annotation point P1, based on the points in the environment model M2 that now align with other annotation points of the virtual object model, an evaluation of those other annotation points may then be performed to verify that they also are sufficiently aligned with points in the environment model M2, e.g., by generating function values for these other points in the model M1 and comparing them to the corresponding points in the model M2 that they are now aligned with to determine if they are sufficiently similar, e.g., the difference is equal to or below a threshold difference value. If they are determined to be sufficiently aligned, then their characteristics are updated to represent the new alignment with the corresponding points of the environment model M2, e.g., the coordinates of the annotation point may be updated. If they are determined to not be sufficiently aligned, a notification may be output to the human operator and the characteristics of those additional annotation points in the model M1 will not be automatically updated. This will allow the human operator to make manual repositioning of the virtual object within the AR representation if desired. This process can then be repeated until all annotation points are sufficiently aligned or the human operator does not desire any more modification of the virtual object location within the AR representation, at which point the characteristics of the additional annotation points may be updated based on their current alignments with points in model M2 of the AR representation.

Once aligned in this manner, the models M1 and M2 may be combined to generate an AR model M3. The AR model M3 will have the combination of the virtual object model M1 characteristics for the aligned points and the real-world environment model M2 characteristics for the aligned points. Any conflicts in these characteristics may be resolved using any suitable resolution algorithm, such as giving preference to characteristics of either model M1 or model M2 based on a desired implementation. The AR model M3 may be used to present the AR representation of the currently viewed real-world environment to the human operator for use in performing tasks, e.g., inspecting and diagnosing problems, repairing machinery, or the like, where these tasks are dependent upon the particular AR application and the particular use of the AR application, e.g., in a medical field, manufacturing field, scientific field, machine diagnostic and repair field, etc. The AR model M3 is used by the AR application to superimpose or otherwise overlay AR model M3 elements on captured images or video of the currently viewed real-world environment, in a manner similar to known AR mechanisms. In providing the overlay or superimposing of AR model M3 elements, the annotation points of the virtual object model M1 are satisfactorily aligned with the real-world environment model M2 such that they will be positioned correctly in the images or video of the currently viewed real-world environment and can be viewed and interacted with by the human operator via the AR application's interface.

Thus, the illustrative embodiments provide mechanisms that automatically refine the locations of annotation points of virtual object models relative to images of the currently viewed real-world environment so that they are accurately located even when there are differences in the currently viewed real-world environment from what is expected or what the real-world environment was when the virtual object model was created. For example, in a vehicle diagnostic and repair scenario, the virtual object model may have been generated for a 2020 Ford F-150 truck, such as by capturing images of the object from an actual physical object as part of the vehicle and using 3D modeling applications to generate a 3D model of the physical object, e.g., 3D point cloud modeling applications. Thus, the virtual object model, e.g., a model of a hose in the engine compartment, may have a particular configuration represented by the 3D point cloud model where certain points in the 3D point cloud model are annotated with SME provided annotations to instruct a mechanic on how to replace/repair the hose. The 3D point cloud model will have characteristics that are specific to the year, make, and model of the truck. Thereafter, such as in the year 2022, there may be design changes to the Ford F-150's engine compartment which cause the hose to be located in a different location. As a result, when generating an AR representation, without the mechanisms of the illustrative embodiments, the virtual object of the hose and its corresponding annotations may be mislocated within an AR representation of the currently viewed real-world environment. With the illustrative embodiments, through an automated process of evaluating the characteristics of the virtual object model relative to the characteristics of a model of the currently viewed real-world environment, the mislocation may be identified and corrected so that the virtual object and its annotations are relocated to a correct position within the AR representation of the currently viewed real-world environment. That is, the human operator may specify in the AR application that what is being currently viewed is a 2022 Ford F-150 and, as a result, the virtual object models, their annotations, etc., for the same year, make and model of vehicle may be retrieved if possible. If virtual object models do not exist for this particular combination of year, make, and model, any subset of these may be used to retrieve corresponding virtual object models, e.g., the make and model (Ford F-150).

It should be appreciated that this process may also be used to automatically generate new virtual object models based on the updates to the previous virtual object model generated through the refinement operation. That is, in the scenario above, the original virtual object model, e.g., for the hose, may be associated with the particular vehicle that was the source of the images for generating the virtual object model, e.g., 2020 Ford F-150. When that virtual object model is updated through the refinement operations described previously, the updated virtual object model may be stored in association with identifiers of the currently viewed real-world environment, e.g., 2022 Ford F-150, such that a new set of virtual object models may be created automatically based on previously generated virtual object models and refinement of these virtual object models. It should be appreciated that this process assumes that there are similarities between the real-world environment whose images were used to generate the original virtual object models and the currently viewed real-world environment such that the refinement operation generates satisfactory updates to the virtual object models. For example, using a virtual object model of a hose in the engine compartment of an automobile to provide an AR representation for a currently viewed airplane engine would not yield satisfactory results.

Thus, it is clear from the above that the present invention provides an improved computing tool that is specifically directed to solving the technological problems associated with the generation of augmented reality (AR) representations of real-world environments via computing devices by providing an automated refinement operation for aligning virtual object models with models of currently viewed real-world environments. This improved computing tool provides automated functionality for accurately locating annotation points of virtual object models with corresponding points in a model of the currently viewed real-world environment, thereby making the AR representation more accurate and providing an AR output that places annotations in correct positions within the augmented images of the real-world environment. The improved computing tool of the illustrative embodiments is thus, providing a solution to a problem that only exists because of and in computer technology and provides a specific technological solution to that computer specific problem. While the illustrative embodiments may operate on conjunction with a human operator, and provide a significant benefit to the human operator, the illustrative embodiments are directed to the operation of the improved computing tool and not the actions performed by the human operator. Moreover, as the illustrative embodiments provide an improved computing tool that specifically is directed to augmented reality technology and alignment of points in computer models to generate improved augmented reality representations of real-world environments, the improved computing tool of the illustrative embodiments cannot be practically performed in the human mind Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
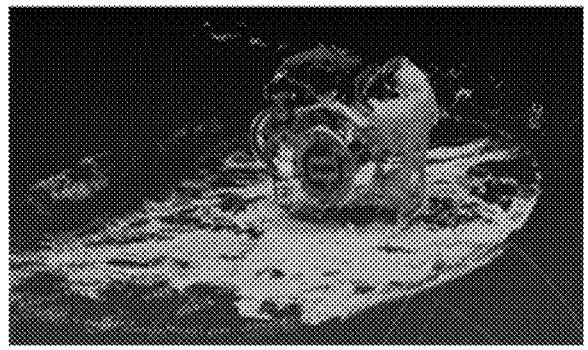
Figure 1C:
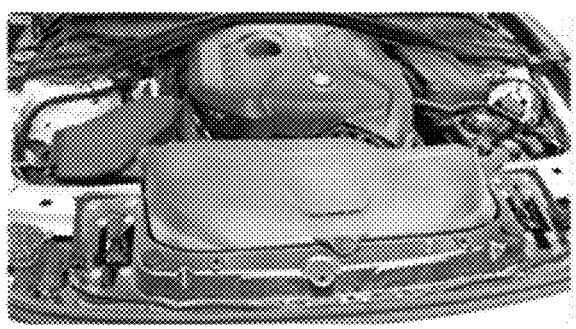
Figure 1D:
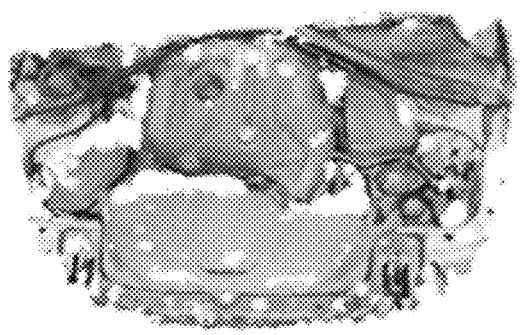

As discussed above, the illustrative embodiments are directed to an improved computing tool and improved computing tool methodology for improving augmented reality (AR) representations of real-world environments by providing refinement tools to refine the location of virtual object models and their annotation points within the AR representation of the real-world environment. As an initial operation of this process, it is assumed that virtual object models are generated for virtual objects that are to be the source of overlays or superimposed content of the AR representation. As noted above, any suitable 3D computer modeling process may be used to generate these virtual object models, but for purposes of the present description it is assumed that a 3D point cloud computer model is generated for a real-world object so as to generate a virtual object model. FIGS. 1A-1D provide examples of real-world objects and their corresponding 3D computer models. FIG. 1A shows a real video frame of an engine with FIG. 1B showing a 3D computer model generated for this same engine (it should be noted that the 3D computer model is generated from a plurality of real video frames and not just a single video frame). FIG. 1C shows a real video frame of a card engine compartment and FIG. 1D shows a corresponding 3D computer model generated for this same engine compartment. Such 3D computer modeling is generally known in the art and typically involves the use of an image capture device, sensor devices, such as laser sensor devices, and/or the like, to generate the points of the 3D model that are then used to represent the object as a virtual object in a 3D virtual object space. As discussed previously, in some cases, a polygonal mesh may be generated based on the point cloud or the like so as to allow AR applications to represent the physical object as a virtual object.

Once a virtual object model is generated for the real-world object, a subject matter expert (SME) may annotate selected points of the virtual object model for the particular purpose desired and provide annotation data that the AR applications can render in their AR representations of the real-world environment to facilitate understanding of the real-world environment, performance of tasks in the real-world environment, or otherwise augment the AR representation of the real-world environment with additional digital content. The annotation data may be linked to the selected annotation points such that the annotation data is made part of the virtual object model and associated with the points at coordinate locations corresponding to the annotation point coordinates.

An AR application engine operates based on the virtual object models to generate an AR representation of a real-world environment by augmenting the captured images/video of the real-world environment with digital content corresponding to the virtual object models of virtual objects that either correspond to physical objects present in the captured image or otherwise are to be represented in combination with the physical objects, but not necessary present as physical objects, e.g., new virtual objects that are to appear to be present in the physical real-world environment but are not in fact there. In some cases, the AR representation may present the annotation data in correlation with points in the captured image that are determined to be correlated with annotation points of one or more of the virtual object models. In correlating the virtual object models with the captured images/video of the real-world environment, a model of the real-world environment may be generated based on the captured images/video in a similar manner to that used to generate the virtual object models, but on a more temporary basis, and the correlation may be performed by analyzing the captured images/video and/or generated environment model using artificial intelligence systems, such as convolutional neural networks (CNNs), deep learning neural networks (DNNs), and the like. For example, AI systems, such as the YOLO object detection system, RCNN object detection system, or FRCNN object detection system, which use video or images as the input and find desired objects within the images/video based on a convolutional operation and other deep learning network layer operations, may be used without departing from the spirit and scope of the present invention. It should be appreciated that due to limitations in these systems, while the object may be detected, this does not mean that the virtual object models corresponding to these objects, or their annotation points, are properly aligned within the images/video when performing this object detection.

Thus, assuming that there are existing virtual object models, and AR application engines that may employ AI systems, such as trained neural networks, AR representations may be generated that integrate the virtual objects into the images/video of the real-world environment in a display of the real-world environment on a computing device. However, as previously discussed above, the integration of the virtual objects into the AR representation of the real-world environment may be inaccurate for many reasons, with one being that there are changes to the real-world environment from that of the real-world environment that existed when the virtual object models were generated, e.g., differences in the design of a subsequent make/model of the vehicle in the examples described previously.

Figure 2:
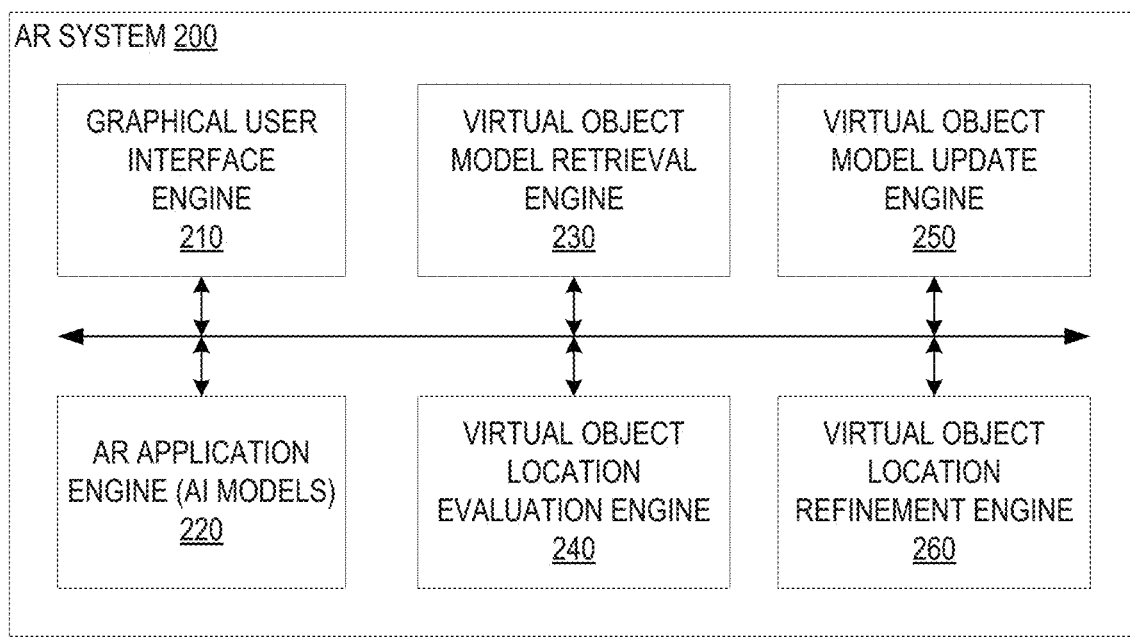
FIG. 2 is an example block diagram of the primary operational components of an AR system that is configured to perform virtual object annotation point refinement in accordance with one illustrative embodiment.

The illustrative embodiments provide an improved computing tool and improved computing tool methodology and operations to perform automated refinement of virtual object model annotations within an AR representation of a real-world environment so as to make the locations of the virtual object and its annotations accurate to the real-world environment being represented by the AR application. FIG. 2 is an example block diagram of the primary operational components of an AR system that is configured to perform virtual object annotation point refinement in accordance with one illustrative embodiment and which operates to increase the accuracy of the integration of virtual objects into an AR representation of a currently viewed real-world environment. The components of the AR system may be implemented as dedicated computer hardware elements, specialized software executed on computer hardware that specifically configures the computer hardware to be, and perform the operations of, the components shown in FIG. 2, or may be any combination of dedicated computer hardware elements and specialized software configured computer hardware devices.

The AR system 200 may be implemented in one or more computing devices, such as server computing devices or client computing devices, and may communicate with one or more other computing devices via one or more data networks. For example, the AR system 200 may be implemented in a portable computing device, such as a smart phone, tablet computing device, laptop computing device, or the like, which is equipped with one or more image capture devices that may be used to capture images/video of a real-world environment. In some embodiments, the AR system 200 can be implemented on a server computing device, with which a client computing device, such as a portable computing device, may interact to perform the operations described herein and provide the results of such operations to the client computing device for use by a human operator. The AR system 200 may make use of virtual object models that may be stored in a remote storage system accessible via one or more data networks, or stored locally in a local storage of the computing device(s) on which the AR system 200 is implemented. For purpose of the following description, it will be assumed for purposes of illustration that the AR system 200 is implemented in a portable computing device and that the virtual object models are likewise stored in a local storage of the portable computing device such that data network access is not required. However, it will be readily apparent to those of ordinary skill in the art in view of the present description how the present invention may be implemented in a distributed manner with components distributed across multiple computing devices and data storage systems using one or more data networks and corresponding data network communication mechanisms.

As shown in FIG. 2, the AR system 200 includes a graphical user interface (GUI) engine 210 and an AR application engine 220 which includes one or more trained artificial intelligence (AI) computer models for object detection and logic for integrating virtual objects into AR representations of real-world environments. The AR system 200 further includes a virtual object model retrieval engine 230, a virtual object location evaluation engine 240, a virtual object model update engine 250, and a virtual object location refinement engine 260. It should be appreciated that these are not the only components of the AR system 200, but are the primary ones for explaining the operation of the improved computing tool. Other components are also present, although not explicitly shown, such as operating systems, libraries, device drivers and interfaces with peripheral devices, interfaces with image capture devices through which digital images/video of a real-world environment and physical objects may be captured for further processing, interfaces for displaying outputs of the AR system 200 and/or providing audio outputs, etc.

The GUI engine 210 provides a user interface through which content may be presented to a human operator of the AR system 200 and through which input from the human operator may be received to provide information upon which the AR system 200 operates. For example, an initial GUI may be generated and provided by the GUI engine 210 through which a human operator may specify the identity of the real world environment that is being currently viewed by the image capture devices of the computing device in which the AR system 200 is implemented. In some cases, the human operator may specify a particular task that the human operator is attempting to perform with regard to the currently viewed real-world environment. The human operator may specify the identity of the real world environment and/or task in any suitable manner for the particular implementation. For example, the GUI may provide a listing of known real-world environments for which virtual object models are available, a listing of known tasks that can be performed with regard to corresponding ones of these real-world environments, and the user may select suitable ones from the listings, which may not be the exact same real-world environment as the one being currently viewed or the specific task, but may be the closest ones for which virtual object models are available, e.g., if the currently viewed real-world environment is a 2022 Ford F-150, but that environment is not in the listing, then the human operator may select a closest one, such as a 2020 Ford F-150. For purposes of this description, it will be assumed that the user specifies the identity of a particular real-world environment, with the specification of a particular task as another option in addition to the real-world environment identification, but not required.

Based on the specification of the real-world environment and/or task to be performed, a corresponding set of predefined virtual object models for the specified real-world environment may be retrieved via the virtual object model retrieval engine 230. The virtual object (VO) model retrieval engine 230 interfaces with a local or remote VO model storage system (not shown) to retrieve the set of one or more VO models corresponding to the specified real-world environment. The VO models may have been previously generated in a manner previously described above using any suitable VO model generation applications, such as a 3D point cloud model application or the like. The VO models are annotated with annotation points that include annotation data specifying content that is to be displayed or otherwise output as part of an AR representation. The points of the 3D point cloud or other VO model preferably have various characteristics associated with them including 3D coordinates in a virtual environment space, as well as other characteristics which may include color, luminescence, density information indicating a density of the surrounding points in the VO model, annotation data if the point is annotated, and the like.

The AR application engine 220, with its trained AI model(s) analyzes captured image data for the currently viewed real-world environment and attempts to find objects in the captured image data corresponding to the virtual object(s) corresponding the retrieved VO model(s) (M1). Again, the AI model(s) of the AR application engine 220 may comprise one or more trained convolutional neural networks (CNNs), deep learning neural networks (DNNs), or other object detection models. The detection of objects within the captured image data may comprise the AR system 200 generating at least one second model (M2) for modeling the currently viewed real-world environment such that object detection can be performed, such as by comparing patterns of characteristic values, or a function value generated based on these characteristic values, for points in the VO model(s) (M1) with patterns of characteristic values, or a function value generated based on these characteristic values, for points in the at least one second model (M2) of the currently viewed real-world environment. The detection of the objects within the captured image data provides an initial correlation between the retrieved VO models and the captured image data for the currently viewed real-world environment. However, it should be appreciated that this object detection may not be sufficiently accurate due to differences in the real-world environment relative to the environments used to generate the VO models or limitations in the object detection capabilities. Moreover, while this initial correlation may provide an initial estimation as to where the annotation points of the VO models should be located, this initial estimate may have significant errors requiring refinement.

Thus, by using the computing device to capture images of the currently viewed real-world environment, the AR application engine 220 generates an initial estimate of an AR representation of the currently viewed real-world environment which may be automatically analyzed and/or presented to a human operator, in which virtual objects, or at least their annotations, are represented in the computing device's output. That is, the AR application engine 220 may represent the images of the real-world environment on the display screen of the computing device, via a graphical user interface provided by the graphical user interface engine 210, with annotations and/or overlays of the virtual objects on the images being output on the computing device's display. The AR application engine 220 may modify the images being output as the human operator manipulates the computing device, e.g., moves the computing device relative to the real-world environment such that new perspectives are presented, and/or manipulates the display, e.g., through user interaction with a touchscreen or other peripheral of the computing device to thereby interact with a graphical user interface, presented by the graphical user interface engine 210, or other user interface of the computing device. It should be noted that in presenting the AR representation via the AR application engine 220 and the graphical user interface engine 210 along with the display, the virtual object itself need not be explicitly represented and only the annotations may be presented as graphical objects so as to maximize the viewability of the real-world environment in the display of the computing device but providing annotations to assist the human operator, e.g., overlays of flags or other graphical/textual representations of annotations may be presented with lines or other pointers to their associated points in the AR representation.

Assuming that the correlation between points in the VO model(s) M1 are accurate with the at least one second model of the currently viewed real-world environment M2, then the annotations and/or overlays of the virtual objects in the AR representation, will be accurately shown in the output of the AR application engine 220. Thus, the human operator may interact with the AR application's, such as via the GUI generated by the GUI engine 210, to follow the procedure or perform operations specified in the annotations with regard to real-world objects to thereby perform a desired task defined by the combination of annotations. This can be accomplished even if the human operate is unfamiliar with the real-world objects or real-world environment as the annotations may provide a step-by-step guidance to the human operator allowing them to accomplish the task, e.g., replacing a hose in the engine compartment of the vehicle.

However, as mentioned above, if the real-world environment currently being viewed does not match the real-world environment that was present when the VO model(s) M1 of the virtual object(s) were generated, or due to limitations in the object detection capabilities, then there will be an inconsistency and error in the AR representation of the real-world environment currently being viewed by the human operator, e.g., virtual objects will be mislocated in the AR representation and thus, the corresponding annotations will be likewise mislocated. That is, when the AR representation is being generated by the AR application by integrating the points of the one or more virtual object models M1 with the points in the at least one model of the currently viewed real-world environment M2, there will be a mismatch due to changes in the real-world environment or limitations of the object detection as previously described above.

This mis-location of the VO model(s) and/or annotation points of the VO models may be detected automatically and/or specified by a human operator viewing the initial estimate of the AR representation. For example, the initial estimate of the AR representation may be provided as an output to the human operator via the GUI engine 210 along with GUI elements that the human operator can interact with to request a refinement of the VO and/or annotation point locations. Thus, if the human operator interacts with the GUI element, the refinement operation of the illustrative embodiments may then be automatically performed. Alternatively, or in addition, the AR system 200 may automatically analyze the annotation points in the initial AR representation estimate to automatically determine whether the annotation points are mislocated.

With regard to the automatic analysis of the initial AR representation, the virtual object location evaluation engine 240 may execute an automated analysis and comparison of the of the characteristics of the points of the VO model (M1) with aligned or correlated points in the model of the currently viewed real-world environment (M2) to determine if points of the VO model M1 have sufficient similarity, i.e., within a threshold, of points in the environment model M2 of the currently viewed real-world environment. That is, aligned points in M1 and M2 are compared to determine if they have similar characteristics, such as depth, density, distance from each other, color, luminescence, etc. If such points have sufficient similarity, e.g., their differences are equal to or less than a predetermined threshold, then the virtual object model may be determined to be satisfactorily positioned within the AR representation, but allowing the user to override such a determination and request refinement if desired via the GUI and GUI elements. If such points do not have sufficient similarity, e.g., the differences are greater than the predetermined threshold, then a refinement operation may be automatically initiated with the virtual object location refinement engine 260. It should be appreciated that this automated analysis may be performed specifically with regard to only points of the VO model that have associated annotations, i.e., annotation points, a plurality of randomly selected points of the virtual object model, i.e., a subset of the points of the virtual object model, or the like. Satisfactory alignment and integration of the VO model into the AR representation may be determined based on a function of how well these points are aligned, e.g., if a majority or a certain number or percentage of the points are satisfactorily aligned, as measured by the threshold based comparison as described above, then the virtual object model may be considered satisfactorily aligned; otherwise, it is not.

In performing the comparison to determine if refinement is necessary, and/or as part of the evaluations of points during the refinement operation, a function of the characteristics of the points, and/or points within a given range of the point of interest, may be used to perform the comparisons and evaluate similarity of points. As noted above, this function can take many different forms depending on the desired implementation. In one illustrative embodiment, this function is generalized as set forth in Eq. 1 above. As an example, in one implementation of an illustrative embodiment, this function may be as follows:

$$\text{func}=a*Dis(p)+b*(\text{Dense}(p))+c*\text{Depth}(p)+d \qquad (2)$$

where, a, b, c, and d are constant coefficients, Dis( ) Dense, and Depth are the functions to compute the distance, density, and depth respectively at location p. Such a function may be evaluated for given points p in the VO model M1 and the corresponding point (p') in the environment model M2 to determine if the two function values generated have a difference that is within an acceptable tolerance specified by a threshold value. The point p may be an annotation point of the VO model and the point p' may be the current estimate of the location of the annotation point in the AR representation, i.e., the location within the environment model M2 where it is believed that the annotation point p should be located. Based on this comparison and evaluation of the difference in function values, it is determined whether the annotation point is properly aligned with the environment currently being viewed in the AR representation and if not, a refinement operation may be triggered. For example, if the difference between the function value of a first point and the function value of a second point is equal to or below a predetermined threshold value, then the points are determined to be sufficiently similar or sufficiently aligned. If the difference between the function values is greater than the predetermined threshold value, then they are determined to be not sufficiently similar or not sufficiently aligned.

Assuming that a refinement operation is needed to refine the annotation point p location in the integration of the virtual object model M1 with the environment model M2 in the AR representation, i.e. a new candidate location p' is needed, the refinement operation is initiated via the virtual object location refinement engine 260 which comprises logic to execute the refinement operation as described herein. As previously mentioned above, this refinement operation involves performing a search of points in the environment model M2 for a point P2 having a function value that is sufficiently similar or sufficiently aligned with the function value of the annotation point P1. That is, given an annotation point P1 of a VO model, and based on an initial attempt at alignment of the VO model M1 with the environment model M2 to identify a starting point SP in the environment model M2 as the initial estimate as to a point p' with which annotation point P1 is aligned, a search for a point P2 is performed within a given search step size of the starting point SP. For example, a search may be performed by selecting points in a range or radius around the starting point SP, in 3D space, where the range/radius is equal to the search step size.

As discussed above, the virtual object location refinement engine 260 may randomly or pseudo-randomly select points from the environment model M2 which are within a given range or radius of the starting point SP. The search may be, for example, a random gradient search or other random search algorithm. The function of Eq. 1, or in the example embodiment above this function may be Eq. 2 or the like, above may be calculated by the virtual object location refinement engine 260 for the annotation point P1 and for the selected search point. The absolute difference value between the function values of points P1 (func(p1)) and PX (func(px)) may then be calculated by the virtual object location refinement engine 260 and compared to a predetermined threshold, where this predetermined threshold specifies a difference indicating the points to be sufficiently similar or sufficiently aligned, i.e., if the absolute difference of the function values for points P1 and PX is equal to or less than the threshold, then the points are sufficiently similar or sufficiently aligned and PX may be considered an appropriate point for alignment of the annotation, i.e., point P2. If the absolute difference of the function values is greater than the threshold, then the points P1 and PX are not sufficiently similar or sufficiently aligned.

If the function value for the point PX is not sufficiently similar to the function value of the point P1, then the virtual object location refinement engine 260 determines whether the number of sampled points within the given range or radius of the start point SP is equal to or greater than a predetermined threshold number of search points. If the number of sampled points is not equal to or greater than the predetermined threshold number of search points, then the virtual object location refinement engine 260 continues the search operation with a next sampled point at the specified range or radius corresponding to the current search step size. If no sufficiently similar point is found through the search operation at the current search step size, and the predetermined number of search points is reached or exceeded, then the virtual object location refinement engine 260 reduces the search step size by a predetermined amount and the search operation is again repeated with the new search step size. This may be repeated until a minimum search step size is reached, where in some cases this minimize search step size may be 0, meaning that the search includes only the original start point SP.

If through this search operation the virtual object location refinement engine 260 does not find a suitable point P2 to align with the annotation point P1, then the human operator may be informed, via the GUI engine 210 and a generated GUI output, that the virtual object model M1 cannot be automatically aligned to the environment model M2 and request that the human operator manually update the alignment of the annotation point with the environment model M2. The manually specified alignment point P2 may then be used by the virtual object model update engine 250 to update the virtual object model M1's annotation point characteristics, and potentially other annotation points of the virtual object model M1 based on the realignment of the virtual object model with the environment model M2. If through this search operation the virtual object location refinement engine 260 finds a suitable alignment with a point in the environment model M2 for the annotation point M1, then the characteristics of the annotation point M1 may be updated to reflect characteristics of the aligned point in the environment model M2. The virtual object model update engine 250 may update these characteristics by generating a new instance of the VO model in the VO model repository or storage system which is linked to or otherwise associated with the identifier of the currently viewed real-world environment, e.g., while the retrieved VO model may be for the 2020 Ford F-150, the updated VO model may be stored and linked to the 2022 Ford F-150 environment. It should be appreciated that in embodiments where both the real-world environment and a specific task are specified by the human operator via the GUI, the VO models generated as a result of this updating of the retrieved VO models and the refinement of their location information with regard to at least the annotation points, may be associated with a combination of identifiers of the real-world environment and the specific task that is being performed.

With regard to updating other points of the VO model what is meant is that, having updated the characteristics of the annotation point P1, based on the points in the environment model M2 that now align with other annotation points of the VO model M1, an evaluation of those other annotation points may then be performed to verify that they also are sufficiently aligned with points in the environment model M2, e.g., by generating function values for these other points in the model M1 and comparing them to the corresponding points in the model M2 that they are now aligned with to determine if they are sufficiently similar, e.g., the difference is equal to or below a threshold difference value. If they are determined to be sufficiently aligned, then their characteristics are updated to represent the new alignment with the corresponding points of the environment model M2, e.g., the coordinates of the annotation point may be updated. If they are determined to not be sufficiently aligned, a notification may be output to the human operator and the characteristics of those additional annotation points in the model M1 will not be automatically updated and/or requesting that the human operator manipulate the AR representation's display to align the VO model's representation to match as many annotation points to points in the environment model as possible. This will allow the human operator to make manual repositioning of the virtual object within the AR representation if desired. This process can then be repeated until all annotation points are sufficiently aligned or the human operator does not desire any more modification of the virtual object location within the AR representation, at which point the characteristics of the additional annotation points may be updated based on their current alignments with points in model M2 of the AR representation.

Once aligned in this manner, the models M1 and M2 may be combined by the AR application engine 220 to generate an AR model M3. The AR model M3 will have the combination of the virtual object model M1 characteristics for the aligned points and the real-world environment model M2 characteristics for the aligned points. Any conflicts in these characteristics may be resolved by the AR application engine 220 using any suitable resolution algorithm, such as giving preference to characteristics of either model M1 or model M2 based on a desired implementation. The AR model M3 may be used to present the AR representation of the currently viewed real-world environment to the human operator for use in performing tasks such as by superimposing or otherwise overlaying AR model M3 elements on captured images/video of the currently viewed real-world environment, in a manner similar to known AR mechanisms. The overlaying or superimposing of AR model M3 elements by the AR application engine 220 based on the refined alignment generated by the virtual object location refinement engine 260 may include, for example, overlaying or superimposing the annotation points of the virtual object model M1 aligned with the real-world environment model M2 locations such that they will be positioned correctly in the images/video of the currently viewed real-world environment and can be viewed and interacted with by the human operator via the AR application's interface provided via the graphical user interface engine 210.

It should be appreciated that the operations described above may be performed for a plurality of VO models associated with a currently viewed real world environment so that each virtual object's information may be properly aligned and represented in the AR representation. Moreover, it should be appreciated that this process may be repeated on a continuous or periodic basis so as to update the AR representation as there are changes in the currently viewed real-world environment. For example, as the human operator performs operations or tasks by interacting with the real-world environment, the current view of the real-world environment will change and thus, a need to dynamically update the AR representation will be needed to make sure that the AR representation is accurate to the current view as it is changed. For example, as a human operator performs the operations of a task, the performance of those operations will cause changes to the viewed environment and the AR system 200 will dynamically detect those changes and automatically initiate the AR system 200 updating the AR representation, which may retrieval, evaluation, and refinement of the location of virtual objects and their associated VO models in the manner described above.

Figure 3:
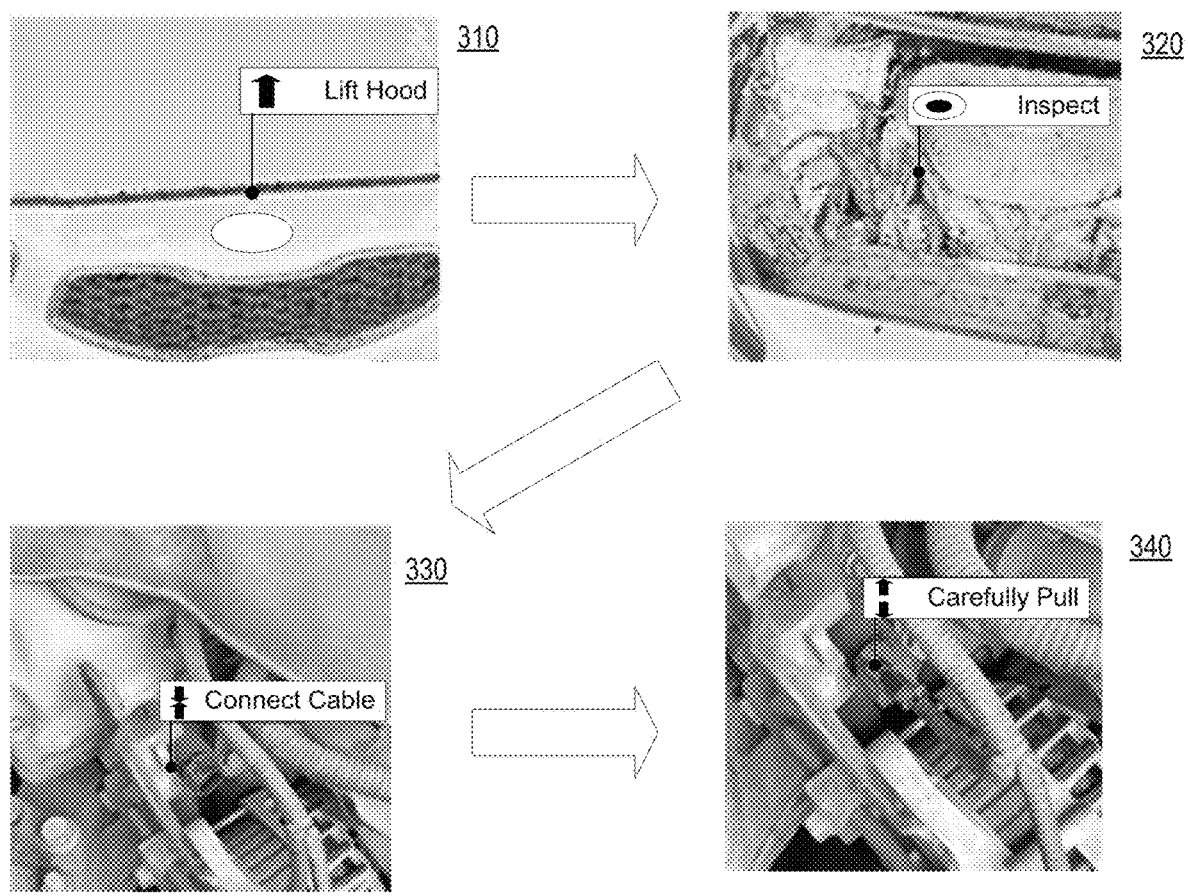
FIG. 3 is an example diagram illustrating a sequence of AR representations providing guidance for performing a task using refined annotation point locations in accordance with one illustrative embodiment.

FIG. 3 is an example diagram illustrating a sequence of AR representations providing guidance for performing a task using refined annotation point locations in accordance with one illustrative embodiment. As shown in FIG. 3, a sequence of current views of a real-world environment is shown in which annotations are superimposed on the images of the real-world environment in accordance with an AR representation generated through the mechanisms of the illustrative embodiments. As shown in FIG. 3, each view of the real-world environment has annotations overlayed or superimposed on the images of the real-world environment currently being viewed, where these annotations instruct the human operator on how to perform a desired task, such as repairing/replacing a cable in an engine compartment of an automobile. Thus, in a first view of the real-world environment 310, the exterior surface of the automobile in the area of the hood is shown with an annotation pointing to a position on the hood and the annotation message indicating to lift the hood, along with an icon showing an arrow up indicating a direction in which to perform the operation. It should be appreciated that this annotation point to which the annotation is attached may be specified as an annotation point on a VO model corresponding to the hood of the automobile, such as a point on the hood of the automobile where the latch is likely present for unlocking the hood.

In a second view of the real-world environment 320, the human operator has raised the hood in accordance with the operation specified in the annotation of view 310 and the AR representation then is updated to reflect the engine compartment of the automobile which includes identifying objects within the engine compartment as represented by captured images of the engine compartment. Through the mechanisms of the illustrative embodiments, an object corresponding to the location of the cable to be repaired/replaced is identified and the corresponding VO model is aligned to generate a location for the annotation "Inspect" in view 320. This annotation includes the annotation message "inspect" as well as an icon indicating the operation to be performed, which in this case resembles a human eye.

In a third view of the real-world environment 330, it is assumed that the human operator follows the instruction of the previous annotation in view 320 and is now directing the image capture device of their portable computing device to the location specified by the "inspect" annotation in view 320. As a result, the environment has again changed, and the AR representation is updated to reflect the new environment with VO model information aligned and refined to generate a new annotation "connect cable" in view 330. As shown in view 330, the annotation is pointing to a location in the AR representation corresponding to a cable connector and has the instruction "connect cable" along with an icon of two arrows pointing towards each other signifying a connection.

In a fourth view of the real-world environment 340, it is assumed that the human operator has followed the instruction of the previous annotation in view 330 and has connected the cable to the cable connector, thereby generating another change in the viewed environment such that the cable is now clearly present in the view 340. As a result, a VO model for the cable may be aligned with the view 340, where such alignment may be refined according to the mechanisms of the illustrative embodiments, such that an annotation "carefully pull" is aligned with a point on the cable in the AR representation. Thus, the annotation "carefully pull" along with the icon of two arrows pointing away from each other, signifying a pull operation, is shown in the view 340 pointing to a point on the cable.

Hence, a step-by-step instruction for accomplishing the task of replacing/repairing the cable is provided through a series of AR representations in which annotation points are properly located according to the mechanisms of the illustrative embodiments. It should be appreciated that, while not explicitly shown in FIG. 3, the annotations of the views 310-340 are user selectable such that if the human operator wishes to obtain more information about the particular operation that they are being instructed to perform, they can select the annotation and obtain more detailed information if desired. Thus, even if the human operator is not familiar with the particular objects or the real-world environment that they are operating in, they can be provided with an AR representation that assists them in accomplishing tasks.

Figure 4:
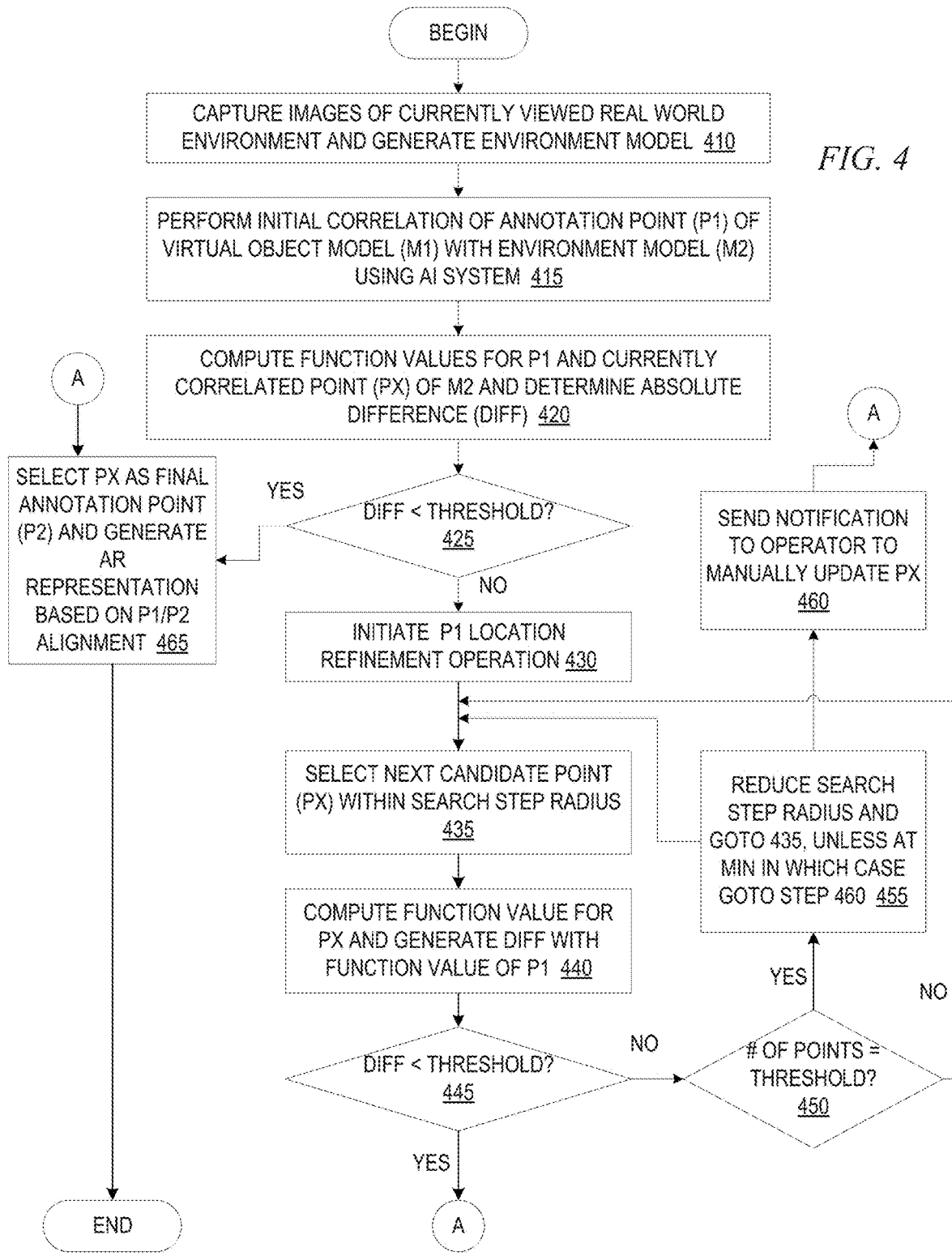
FIG. 4 is a flowchart outlining an example operation for performing virtual object annotation point location refinement in accordance with one illustrative embodiment.

FIG. 4 is a flowchart outlining an example operation for performing virtual object annotation point location refinement in accordance with one illustrative embodiment. The operation outlined in FIG. 4 may be performed by an AR system augmented to include the virtual object location refinement mechanisms as described previously. The operation outlined in FIG. 4 may be performed by specially configured computing devices operating automatically with only some human interaction with interfaces to provide inputs upon which the mechanisms of the illustrative embodiments operate automatically. For example, it is assumed for purposes of FIG. 4 that a human operator has already specified the identity of the real-world environment being viewed and/or the task to be performed such that corresponding previously defined virtual object models may be retrieved from a virtual object model storage. The operation outlined in FIG. 4 is thus, a specific computer operation for aligning one or more of the virtual object models with the current view of the real-world environment, and is not intended to imply any human operation.

As shown in FIG. 4, the operation starts by capturing images of a currently viewed real-world environment and generating a corresponding environment model (step 410). An annotation point of a virtual object model M1 for the real-world environment, from those assumed to have been retrieved based on the specification of the identity of the real-world environment and/or task to be performed, is correlated with the environment model M2 using an AI system, such as an AI based object detection system (step 415). The absolute difference in function values, where the function is a function of the characteristics of the points P1 and PX, of the annotation point (P1) and the estimated alignment point in the environment model (PX), is calculated (step 420) and compared to a threshold difference value (step 425). If the difference value is less than the threshold, then it is determined that the points P1 and PX are sufficiently aligned or similar and PX is selected as the final location (P2) for the annotation point such that an AR representation is generated based on the annotation being at location P2 (step 465). If the difference is equal to or greater than the threshold in step 425, then a refinement operation on the location of the annotation point is initiated (step 430).

As part of the refinement operation, a next candidate point PX is selected by performing a search of points within a given search step radius (step 435). The function value for the new candidate point PX is computed and the absolute difference with the function value of the annotation point P1 is calculated (step 440). The difference value is compared to the threshold (step 445) and if the difference is less than the threshold, the new candidate point PX is selected as the final annotation point P2 in step 465. If the difference is equal to or greater than the threshold in step 445, a determination is made as to whether the number of candidate points investigated so far is equal to a threshold number of candidate points for this search step radius (step 450). If so, then the search step radius is reduced and the operation returns to step 435 where a next candidate point is selected within the newly reduced search step radius (step 455). In step 455, if the search step radius is already at a minimum size, then the operation goes to step 460. In step 460, a notification is sent to the human operator to manually update the candidate point PX which is then selected as the final location for the annotation point in step 465. The operation then terminates.

It should be appreciated that while FIG. 4 shows a termination of the operation after step 465, this operation may be repeated for each virtual object and/or virtual object model. Moreover, as the view of the real-world environment changes, these changes may be detected automatically using object detection and image analysis mechanisms generally known, which may then automatically trigger performance of the operations of the present invention with regard to the objects detected in the new view of the real-world environment. Thus, this process and operation may be performed repeatedly in a continuous or periodic manner where triggering events, such as changes in the viewed real-world environment, may operate as triggers for the periodic performance of the operations.

Figure 5:
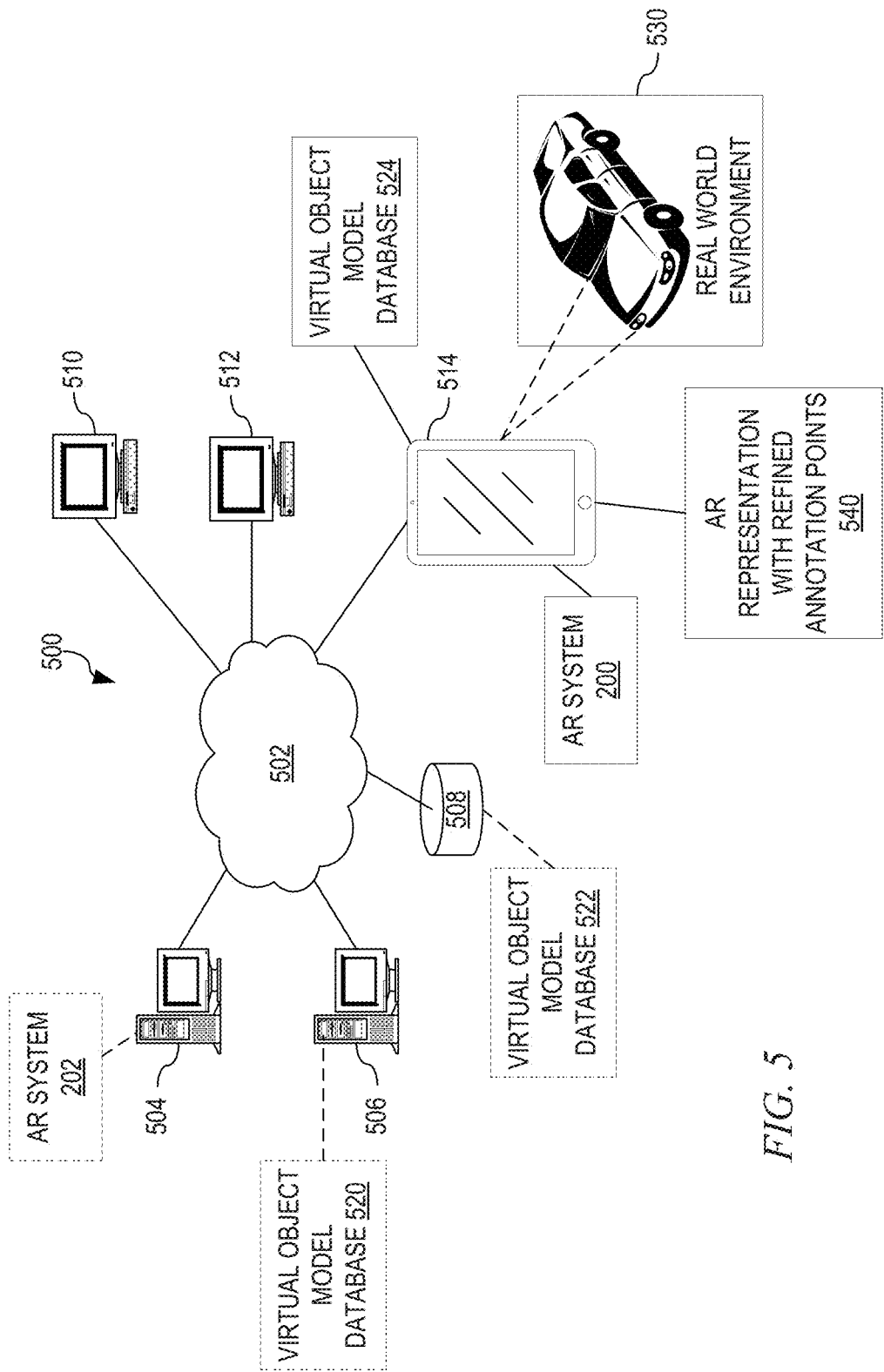
FIG. 5 is an example diagram of a distributed data processing system in which aspects of the illustrative embodiments may be implemented.
Figure 6:
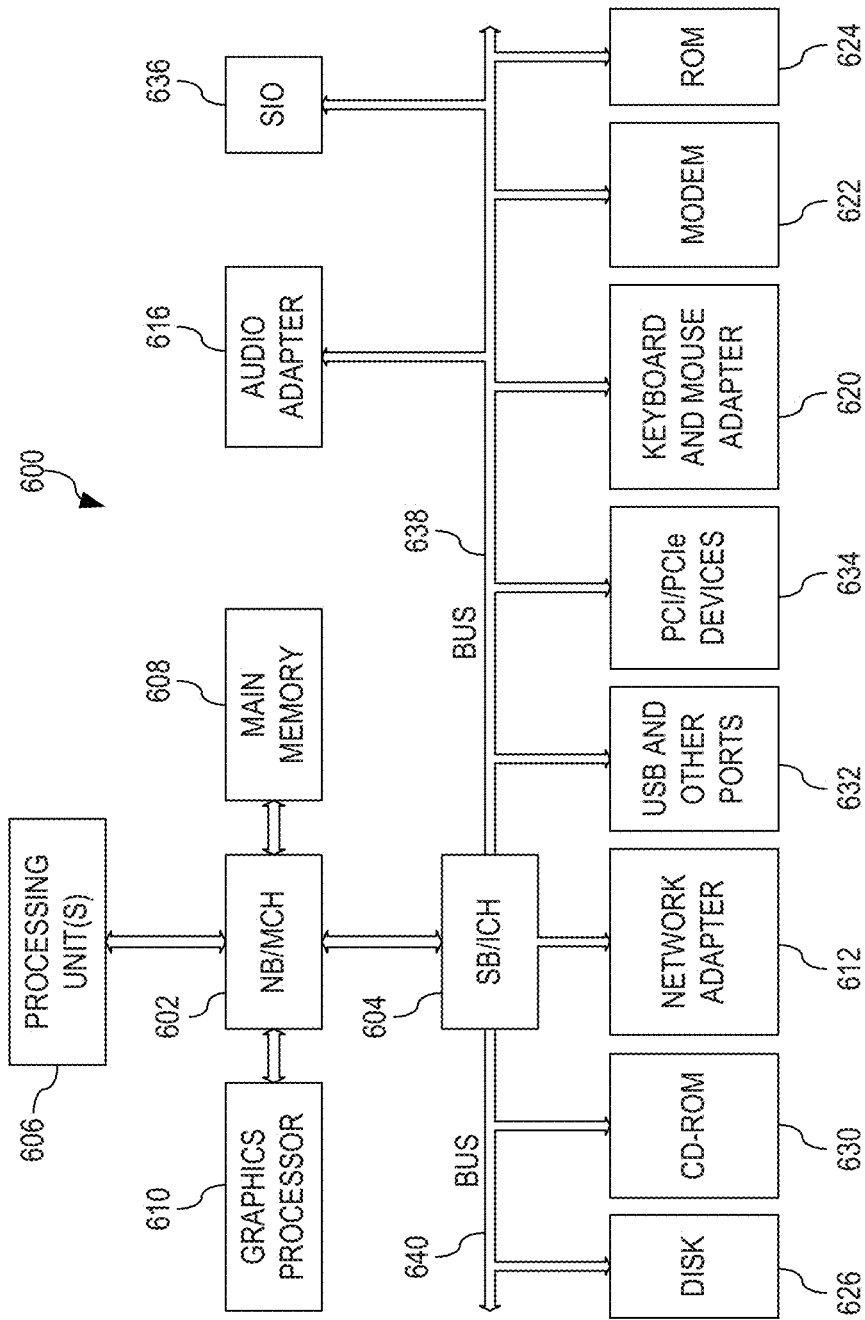
FIG. 6 is an example block diagram of a computing device in which aspects of the illustrative embodiments may be implemented.

It is clear from the above that the illustrative embodiments are directed to an improved computing tool that operates specifically in a computing environment to provide an augmented reality representation of a real-world environment with accurately identified annotation point locations. It should be appreciated that the illustrative embodiments may be utilized in many different types of data processing environments including entirely within a stand-alone computing device or in a distributed data processing system environment involving multiple computing devices and one or more data networks that may be wired and/or wireless. In order to provide a context for the description of the specific elements and functionality of the illustrative embodiments, FIGS. 5 and 6 are provided hereafter as example environments in which aspects of the illustrative embodiments may be implemented. It should be appreciated that FIGS. 5 and 6 are only examples and are not intended to assert or imply any limitation with regard to the environments in which aspects or embodiments of the present invention may be implemented. Many modifications to the depicted environments may be made without departing from the spirit and scope of the present invention.

FIG. 5 depicts a pictorial representation of an example distributed data processing system in which aspects of the illustrative embodiments may be implemented. Distributed data processing system 500 may include a network of computers in which aspects of the illustrative embodiments may be implemented. The distributed data processing system 500 contains at least one network 502, which is the medium used to provide communication links between various devices and computers connected together within distributed data processing system 500. The network 502 may include connections, such as wire, wireless communication links, or fiber optic cables.

In the depicted example, server 504 and server 506 are connected to network 502 along with storage unit 508. In addition, clients 510, 512, and 514 are also connected to network 502. These clients 510, 512, and 514 may be, for example, personal computers, network computers, or the like. In the depicted example, server 504 provides data, such as boot files, operating system images, and applications to the clients 510, 512, and 514. Clients 510, 512, and 514 are clients to server 504 in the depicted example. Distributed data processing system 500 may include additional servers, clients, and other devices not shown.

In the depicted example, distributed data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 500 may also be implemented to include a number of different types of networks, such as for example, an intranet, a local area network (LAN), a wide area network (WAN), or the like. As stated above, FIG. 5 is intended as an example, not as an architectural limitation for different embodiments of the present invention, and therefore, the particular elements shown in FIG. 5 should not be considered limiting with regard to the environments in which the illustrative embodiments of the present invention may be implemented.

As shown in FIG. 5, one or more of the computing devices, e.g., server 504, client 514, or the like, may be specifically configured to implement an augmented reality system that is configured to provide a virtual object annotation point location refinement functionality 200 or 202.

The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 504 or client 514, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates accurate AR representations of real-world environments with annotation information overlayed or superimposed at accurate locations even in the case that the real-world environment does not match the real-world environment present when the virtual object models used to generate the AR representation were generated.

As shown in FIG. 5, a client device 514, which may be a portable computing device, such as a smartphone, tablet computing device, or the like, is configured to implement the AR system 200 which operates in the manner previously described with regard to one or more of the illustrative embodiments. As such, the client computing device 514 may capture images of a real world environment 530, such as an engine compartment of an automobile as one example, and may use the AR system 200 to generate an AR representation with refined annotation points 540. The AR system 200 may make use of previously generated VO models stored in a VO model database 524 that is local to the client computing device 514, or in a VO model database 520, 522 remotely located in a network attached data storage 408 or other computing device, such as server 506. Moreover, in some cases, the client computing device 514 may operate to capture images of the real world environment 530 which it then communicates with a remotely located AR system 202 on a server 504 which may then perform the operations of the one or more of the illustrative embodiments based on VO models stored in a local or remote database, e.g., 520-524. In such a case, the AR system 202 may provide the resulting AR representation with refined annotation points 540 to the client computing device 514 for output to the human operator.

As noted above, the mechanisms of the illustrative embodiments utilize specifically configured computing devices, or data processing systems, to perform the operations for generating an AR representation with refined annotation points. These computing devices, or data processing systems, may comprise various hardware elements which are specifically configured, either through hardware configuration, software configuration, or a combination of hardware and software configuration, to implement one or more of the systems/subsystems described herein. FIG. 6 is a block diagram of just one example data processing system in which aspects of the illustrative embodiments may be implemented. Data processing system 600 is an example of a computer, such as server 504 in FIG. 5, in which computer usable code or instructions implementing the processes and aspects of the illustrative embodiments of the present invention may be located and/or executed so as to achieve the operation, output, and external effects of the illustrative embodiments as described herein.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 600.

As a server, data processing system 600 may be, for example, an IBM eServer™ System p® computer system, Power™ processor based computer system, or the like, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

As mentioned above, in some illustrative embodiments the mechanisms of the illustrative embodiments may be implemented as application specific hardware, firmware, or the like, application software stored in a storage device, such as HDD 626 and loaded into memory, such as main memory 608, for executed by one or more hardware processors, such as processing unit 606, or the like. As such, the computing device shown in FIG. 6 becomes specifically configured to implement the mechanisms of the illustrative embodiments and specifically configured to perform the operations and generate the outputs described herein with regard to the AR system augmented to perform annotation point location refinement.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for generating an augmented reality representation of a real-world environment, the method comprising:
   receiving, by an augmented reality (AR) system of the data processing system, a captured digital image of the real-world environment;
   generating, by the AR system, an initial estimate of a first candidate point specifying an estimated location of an annotation point of a virtual object model within the captured digital image of the real-world environment;
   evaluating, by the AR system, an accuracy of the initial estimate based on a function of characteristics of the annotation point and a function of characteristics of the first candidate point;
   in response to the evaluation of accuracy indicating that the initial estimate is not accurate, executing, by the AR system, an annotation point location refinement operation to generate a refined candidate point for aligning the annotation point with the captured digital image of the real-world environment; and
   generating an AR representation of the real-world environment based on the refined candidate point, wherein the AR representation comprises the captured digital image of the real-world environment augmented with an annotation corresponding to the annotation point.

2. The method of claim 1, wherein generating the initial estimate of the first candidate point comprises correlating first points of the virtual object model with second points in a computer model of the real-world environment.

3. The method of claim 1, wherein the characteristics of the annotation point and the characteristics of the first candidate point comprise at least one of a depth characteristic, density characteristic, distance from a reference point characteristic, color characteristic, or luminescence characteristic.

4. The method of claim 1, wherein evaluating the accuracy of the initial estimate further comprises evaluating the function of characteristics of the annotation point and a function of characteristics of the first candidate point for a plurality of annotation points and a plurality of candidate points, and evaluating the accuracy based on a combination of results of the evaluations for the plurality of annotation points and plurality of candidate points.

5. The method of claim 1, wherein executing the annotation point location refinement operation further comprises:
    executing a search of alternative candidate points within a predetermined range of a starting point corresponding to the current candidate point, wherein the search comprises:
    evaluating, for each alternative candidate point, a function of characteristics of the alternative candidate point to generate a function value;
    comparing the function value of the function of characteristics of the alternative candidate point to a value of the function of characteristics of the annotation point; and
    selecting an alternative candidate point in the alternative candidate points, that has a relatively highest similarity between the function value and the value of the function of characteristic of the annotation point, as the refined candidate point.

6. The method of claim 5, wherein executing the search, evaluating the function, and comparing the function value are performed over a plurality of iterations, each iteration having a different predetermined range of points relative to the starting point.

7. The method of claim 6, wherein, for each iteration a corresponding predetermined range of points for that iteration is relatively smaller than a predetermined range of points for a previous iteration, and wherein the search of alternative candidate points for the iteration comprises performing a random or pseudo-random selection of a predetermined number of points within the predetermined range of points for the iteration.

8. The method of claim 1, wherein the virtual object model is a three-dimensional point cloud virtual object model, and wherein the annotation point is a point in the three-dimensional point cloud virtual object model.

9. The method of claim 1, wherein the annotation point is a location in the virtual object model that has associated annotation metadata, in the virtual object model, that is processed when generating the AR representation to present a visual cue, corresponding to the particular annotation metadata, to a user as part of the AR representation.

10. The method of claim 9, wherein the visual cue comprises textual content that guides a user through a procedure associated with a real world object corresponding to the virtual object model.

11. A computer program product comprising a computer readable storage medium having a computer readable program stored therein, wherein the computer readable program, when executed on a data processing system, causes the data processing system to generate an augmented reality representation of a real-world environment at least by:
    receiving, by an augmented reality (AR) system of the data processing system, a captured digital image of the real-world environment;
    generating, by the AR system, an initial estimate of a first candidate point specifying an estimated location of an annotation point of a virtual object model within the captured digital image of the real-world environment;
    evaluating, by the AR system, an accuracy of the initial estimate based on a function of characteristics of the annotation point and a function of characteristics of the first candidate point;
    in response to the evaluation of accuracy indicating that the initial estimate is not accurate, executing, by the AR system, an annotation point location refinement operation to generate a refined candidate point for aligning the annotation point with the captured digital image of the real-world environment; and
    generating an AR representation of the real-world environment based on the refined candidate point, wherein the AR representation comprises the captured digital image of the real-world environment augmented with an annotation corresponding to the annotation point.

12. The computer program product of claim 11, wherein generating the initial estimate of the first candidate point comprises correlating first points of the virtual object model with second points in a computer model of the real-world environment.

13. The computer program product of claim 11, wherein the characteristics of the annotation point and the characteristics of the first candidate point comprise at least one of a depth characteristic, density characteristic, distance from a reference point characteristic, color characteristic, or luminescence characteristic.

14. The computer program product of claim 11, wherein evaluating the accuracy of the initial estimate further comprises evaluating the function of characteristics of the annotation point and a function of characteristics of the first candidate point for a plurality of annotation points and a plurality of candidate points, and evaluating the accuracy based on a combination of results of the evaluations for the plurality of annotation points and plurality of candidate points.

15. The computer program product of claim 11, wherein executing the annotation point location refinement operation further comprises:
    executing a search of alternative candidate points within a predetermined range of a starting point corresponding to the current candidate point, wherein the search comprises:
    evaluating, for each alternative candidate point, a function of characteristics of the alternative candidate point to generate a function value;
    comparing the function value of the function of characteristics of the alternative candidate point to a value of the function of characteristics of the annotation point; and
    selecting an alternative candidate point in the alternative candidate points, that has a relatively highest similarity between the function value and the value of the function of characteristic of the annotation point, as the refined candidate point.

16. The computer program product of claim 15, wherein executing the search, evaluating the function, and comparing the function value are performed over a plurality of iterations, each iteration having a different predetermined range of points relative to the starting point.

17. The computer program product of claim 16, wherein, for each iteration a corresponding predetermined range of points for that iteration is relatively smaller than a predetermined range of points for a previous iteration, and wherein the search of alternative candidate points for the iteration comprises performing a random or pseudo-random selection of a predetermined number of points within the predetermined range of points for the iteration.

18. The computer program product of claim 11, wherein the virtual object model is a three-dimensional point cloud virtual object model, and wherein the annotation point is a point in the three-dimensional point cloud virtual object model.

19. The computer program product of claim 11, wherein the annotation point is a location in the virtual object model that has associated annotation metadata, in the virtual object model, that is processed when generating the AR representation to present a visual cue, corresponding to the particular annotation metadata, to a user as part of the AR representation.

20. An apparatus comprising:

a processor; and a memory coupled to the processor, wherein the memory comprises instructions which, when executed by the processor, cause the processor to generate an augmented reality representation of a real-world environment at least by:

receiving, by an augmented reality (AR) system of the data processing system, a captured digital image of the real-world environment;

generating, by the AR system, an initial estimate of a first candidate point specifying an estimated location of an annotation point of a virtual object model within the captured digital image of the real-world environment;

evaluating, by the AR system, an accuracy of the initial estimate based on a function of characteristics of the annotation point and a function of characteristics of the first candidate point;

in response to the evaluation of accuracy indicating that the initial estimate is not accurate, executing, by the AR system, an annotation point location refinement operation to generate a refined candidate point for aligning the annotation point with the captured digital image of the real-world environment; and generating an AR representation of the real-world environment based on the refined candidate point, wherein the AR representation comprises the captured digital image of the real-world environment augmented with an annotation corresponding to the annotation point.

* * * * *